3,134,784
N,N'-DIETHYLENE-N"'-(1,3,4-THIADIAZOL-2-YL) PHOSPHORAMIDES
Doris Ruth Seeger, Ridgewood, N.J., and Andrew Stephen Tomcufcik, Tappan, N.Y., assignors to American Cyanamid Company, Stamford, Conn., a corporation of Maine
No Drawing. Filed June 15, 1962, Ser. No. 202,709
9 Claims. (Cl. 260—306.8)

This invention relates to new organic compounds and more particularly is concerned with novel N,N'-diethylene-N"'-(1,3,4-thiadiazol-2-yl)phosphoramides which may be represented by the following general formula:

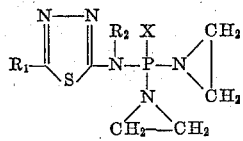

wherein $R_1$ is hydrogen, lower alkyl or halogen, $R_2$ is hydrogen, lower alkyl or mononuclear aryl and X is oxygen or sulfur. Suitable lower alkyl groups contemplated by the present invention are those having up to about 6 carbon atoms. Aryl is exemplified by phenyl.

The new compounds are useful curing catalysts for epoxy resins. As is well known to the art, these resins are condensates of epichlorohydrin and a polyhydric alcohol, i.e., bisphenol. The curing agents have the property of changing a fusible thermosetting resinous material to an infusible thermoset resinous material. The resinous compositions are useful in a variety of applications such as molding, laminating, etc.

The new compounds may be used in curing epoxy resins by methods known to the art. Thus the compounds may be added to the epoxy resin and the mixture heated to effect curing of the hard resinous products. For this purpose temperatures of from 150–180° C. may be used.

The new compounds of this invention also show substantial activity against transplanted mouse tumors Sarcoma 180, $6C_3HED$ lymphosarcoma and $C_3H$ mammary adenocarcinoma $72j$ by both oral and intraperitoneal administration.

The novel compounds have not as yet been demonstrated to be useful in human therapy.

The new compounds may be prepared by reacting the free heterocyclic amine or the hydrochloride salt thereof with phosphorus oxychloride and reacting the corresponding phosphoryl chloride so formed with ethylenimine.

The reaction may be carried out at temperatures ranging from about 0 to 60° C. The final product is isolated and purified by recrystallization from suitable solvents in a standard manner.

The invention will be described in greater detail in conjunction with the following specific examples.

EXAMPLE 1

Preparation of N,N'-Diethylene-N"-Ethyl-N"'-(1,3,4-Thiadiazol-2-yl)Phosphoramide N - ethyl - N - (1,3,4 - thiadiazol - 2 - yl)amidophosphoryl chloride is prepared by refluxing 16.4 parts of 2-ethylamino-1,3,4-thiadiazole hydrochloride with 84 parts of phosphorus oxychloride for 6 hours and then removing the excess phosphorus oxychloride by distillation under reduced pressure. The residual oil is washed with cold petroleum ether, dried and dissolved in 310 parts of dry benzene. This solution is added slowly at 10° C. to a mixture of 9.5 parts of ethylenimine, 30.3 parts of triethylamine, and 44 parts of warm dry benzene. Agitation is continued for 2 hours without cooling after which the triethylamine hydrochloride is filtered off. The benzene is distilled from the filtrate under reduced pressure, and the crude product is recrystallized from hexane, M.P. 95–96° C.

EXAMPLE 2

N,N' - Diethylene - N" - Butyl - N"' - (1,3,4 - Thiadiazol-2-yl)Phosphoramide

N - butyl - N - (1,3,4 - thiadiazol - 2 - yl)aminophosphorylchloride is prepared by refluxing 9.7 parts of 2-butylamino-1,3,4-thiadiazole hydrochloride with 50 parts of phosphorus oxychloride for 3 hours. Distillation of excess phosphorus oxychloride under reduced pressure leaves a residual oil which is washed with cold petroleum ether, dried, dissolved in 65 parts of dry benzene and added slowly at 8° to a solution of 15.2 parts of triethylamine and 4.8 parts of ethylenimine in 98 parts of dry benzene. The mixture is stirred for 2 hours at room temperature and then filtered. Evaporation of the filtrate under reduced pressure gives 11.9 parts of the crude product which is then recrystallized from toluene.

EXAMPLE 3

N,N' - Diethylene - N" - Methyl - N"' - (1,3,4-Thiadiazol-2-yl)Phosphoramide

A mixture of 7.5 parts of 2-methylamino-1,3,4-thiadiazole hydrochloride and 42 parts of phosphorus oxychloride is refluxed for 9½ hours. The phosphorus oxychloride is removed under reduced pressure, and the solid residue is added slowly, with exclusion of moisture, to a solution of 4.8 parts of ethylenimine and 15.2 parts of triethylamine in 175 parts of dry benzene at 5°. The resulting slurry is stirred at 20° and then filtered. Benzene is distilled from the filtrate under reduced pressure, and the crude product is recrystallized from toluene and then from carbon tetrachloride.

EXAMPLE 4

N,N' - Diethylene - N" - Phenyl - N"' - (1,3,4 - Thiadiazol-2-yl)Phosphoramide

A slurry of 3.5 parts of 2-phenylamino-1,3,4-thiadiazole and 2.5 parts of triethylamine in 220 parts of warm benzene is added slowly to a solution of 3.1 parts of phosphorus oxychloride in 90 parts of dry benzene at 10°. The mixture is stirred for 4 hours at 20°, clarified and the filtrate added slowly at 8° of 4.4 parts of triethylamine, 1.9 parts of ethylenimine and 53 parts of dry benzene. The mixture is stirred at room temperature for 2 hours, filtered, and the filtrate evaporated to dryness under reduced pressure. The crude product is recrystallized from toluene.

EXAMPLE 5

N,N'-Diethylene-N"-Ethyl-N"'-(5-Methyl-1,3,4-Thiadiazol-2-yl)Phosphoramide

Nine parts of 2-ethylamino-5-methyl-1,3,4-thiadiazole hydrochloride and 50 parts of phosphorus oxychloride are refluxed for 4 hours. Distillation under reduced pressure leaves an oily residue which is dissolved in 130 parts of dry benzene and added slowly to 15.2 parts of triethylamine, 4.8 parts of ethylenimine and 45 parts of dry benzene at 8°. The mixture is stirred at 20° and filtered. Evaporation of the filtrate under reduced pressure gives 14.7 parts of crude material which is recrystallized from toluene.

EXAMPLE 6

N',N'-Diethylene-N"-Ethyl-N"'-(5-Bromo-1,3,4-Thiadiazol-2-yl)Phosphoramide

A solution of 4.5 parts of 5-bromo-2-ethylamino-1,3,4-thiadiazole and 2.2 parts of triethylamine in 35 parts of warm dry benzene is added slowly to 3.3 parts of phosphorus oxychloride and 53 parts of dry benzene at 8°.

The mixture is warmed to 20° and filtered. Evaporation of the filtrate under reduced pressure leaves an oil which is dissolved in 45 parts of dry benzene and added slowly to 1.9 parts of ethylenimine, 4.6 parts of triethylamine and 90 parts of dry benzene at 9°. The mixture is stirred for 2 hours at 20° and then filtered. The residue obtained by evaporation of the filtrate under reduced pressure is recrystallized from ether.

EXAMPLE 7

*N,N'-Diethylene-N''-Ethyl-N''-(5-Chloro-1,3,4-Thiadiazol-2-yl)Phosphoramide*

Six parts of 5-chloro-2-ethylamino-1,3,4-thiadiazole hydrochloride and 60 parts of phosphorus oxychloride are refluxed for 6 hours. The residual oil obtained by distilling excess phosphorus oxychloride under reduced pressure is dissolved in 30 parts of dry benzene, clarified and added dropwise to 2.6 parts of ethylenimine, 6.7 parts of triethylamine and 53 parts of dry benzene at 6°. The mixture is warmed to 20° and filtered. Benzene is distilled from the filtrate under reduced pressure, and the residual solid is recrystallized from hexane.

EXAMPLE 8

*N,N'-Diethylene-N''-Ethyl-N''-(1,3,4-Thiadiazol-2-yl)Thiophosphoramide*

A mixture of 4.1 parts of 2-ethylamino-1,3,4-thiadiazole hydrochloride and 50 parts of thiophosphoryl chloride is refluxed for 11 hours. Excess thiophosphoryl chloride is distilled under reduced pressure, and the residual oil is washed with cold petroleum ether and dried. A solution of this oil in 22 parts of dry benzene is added dropwise to 4.5 parts of triethylamine, 1.9 parts of ethylenimine and 45 parts of dry benzene at 7°. The mixture is warmed to 20° and filtered. The crude product obtained by evaporation of the benzene under reduced pressure is recrystallized from hexane.

EXAMPLE 9

0.3 gram of N,N'-diethylene-N''-ethyl-N''-(1,3,4-thiadiazol-2-yl)phosphoramide is dissolved in 1.7 grams of Epon Resin 828 [1] with warming. A film is poured on to a glass plate. The resin film is then cured in a forced draft oven with the following results.

| Hours | Temperature | |
|---|---|---|
| | 150° C. | 185° C. |
| 1 | X | |
| 2 | X | |
| 4 | | X |
| 20 | | X |

The film cured at the higher temperature is hard, brittle and resists scratching. All of the films are insoluble in hot methyl ethyl ketone and xylene.

EXAMPLE 10

*Tumor Transplantation*

A mouse bearing a firm tumor is selected, killed by cervical dislocation and submerged in 2% Hyamine for 1 minute. The tumor is then excised under relatively aseptic conditions. The excised tumor is placed in a Petri dish filled with sterile saline and cut into pieces approximately 2 mm. in size. Each particle to be used is placed within the barrel of a sterile 13 gauge trocar. Each trocar is then introduced subcutaneously through the skin of the dorsal lumbar region and the point is carried up to the axillary region where the implant is deposited. The implanted mice are held for 17 days.

[1] Epon Resin 828 is marketed by Shell Development Company and is composed essentially of the diglycidyl ether of bisphenol.

At the end of this period the tumors are palpated and then classified according to size; small, medium or large. Animals from each tumor size category are then randomly distributed into treatment groups with appropriate controls.

*Dose Response Testing*

$C_3H$ mice weighing 18–20 grams bearing 17-day old 72j mammary adenocarcinoma tumors are randomly distributed into groups of six. Each dose response experiment consists of a control and three to five treatment groups with six animals in each group. The compounds are administered intraperitoneally once each day for six days. On the seventh day the tumors are excised and weighed. Results are expressed as an efficacy ratio of the control/treated tumor weights. The results are shown in the table below. It is apparent that the compounds produce tumor inhibition with simultaneous bone marrow depression, weight loss and occasional mortality. For comparison purposes the results with thio-tepa (N,N',N''-triethylene-thiophosphoramide) used as the reference compound are also included.

| Product | Dose, mg./kg. | No. Dead/No. Treated | Mean Marrow Count, C/T | Mean Tumor Weight, C/T | Wt. Diff., C/T |
|---|---|---|---|---|---|
| Thio-Tepa | 6.0 | 24/96 | 6.5 | 16.0 | 5.0 |
| | 4.0 | 6/102 | 4.4 | 10.8 | 3.5 |
| | 2.7 | 2/96 | 2.7 | 5.9 | 2.6 |
| | 1.8 | 2/96 | 1.9 | 4.4 | 2.1 |
| | 1.2 | 5/102 | 1.6 | 3.1 | 1.4 |
| | .4 | 0/6 | 1.2 | 1.6 | 1.1 |
| N,N'-Diethylene-N''-ethyl-N''-(1,3,4-thiadiazol-2-yl)phosphoramide. | 27.0 | 2/6 | 10.5 | 42.0 | 5.6 |
| | 22.5 | 4/12 | 18.0 | 13.0 | 6.4 |
| | 15.0 | 2/30 | 7.5 | 8.0 | 3.2 |
| | 10.0 | 0/30 | 2.7 | 6.9 | 2.7 |
| | 9.0 | 2/6 | 3.1 | 10.8 | 2.7 |
| | 6.7 | 2/30 | 2.0 | 4.0 | 1.2 |
| | 4.4 | 1/30 | 1.5 | 2.7 | 1.4 |
| | 3.0 | 1/24 | 1.5 | 2.1 | .4 |
| | 1.0 | 1/6 | 1.1 | 1.5 | .7 |
| N,N'-Diethylene-N''-methyl-N''-(1,3,4-thiadiazol-2-yl)phosphoramide. | 9.0 | 3/18 | 3.6 | 13.8 | 4.3 |
| | 3.0 | 0/18 | 1.3 | 4.1 | 2.6 |
| | 1.0 | 0/18 | 1.0 | 1.8 | 1.9 |
| N,N'-Diethylene-N''-ethyl-N''-(5-methyl-1,3,4-thiadiazol-2-yl)phosphoramide. | 50.0 | 2/18 | 3.4 | 10.4 | 3.7 |
| | 10.0 | 2/18 | 1.1 | 2.4 | 1.7 |
| | 2.0 | 1/18 | 0.9 | 1.4 | 0.2 |
| N,N'-Diethylene-N''-butyl-N''-(1,3,4-thiadiazol-2-yl)phosphoramide. | 6.3 | 0/18 | 2.8 | 11.8 | 3.1 |
| | 2.1 | 1/18 | 1.2 | 3.6 | 2.4 |
| | 0.7 | 2/18 | 1.0 | 1.5 | 1.5 |
| N,N'-Diethylene-N''-ethyl-N''-(5-bromo-1,3,4-thiadiazol-2-yl)phosphoramide. | 45.0 | 0/24 | 2.0 | 5.4 | 3.0 |
| | 15.0 | 0/24 | 1.3 | 1.7 | 1.0 |
| | 5.0 | 0/24 | 1.0 | 1.2 | −0.1 |
| N,N'-Diethylene-N''-phenyl-N''-(1,3,4-thiadiazol-2-yl)phosphoramide. | 16.2 | 3/18 | 8.7 | 12.2 | 4.6 |
| | 5.4 | 2/18 | 2.7 | 4.0 | 2.5 |
| | 1.8 | 0/36 | 1.2 | 2.5 | 2.0 |
| | 0.6 | 0/18 | 1.0 | 1.8 | 0.8 |
| | 0.2 | 1/18 | 0.9 | 1.4 | 1.3 |

This application is a continuation-in-part of our co-pending application Serial No. 832,140 filed August 7, 1959, now abandoned.

We claim:
1. A compound of the formula:

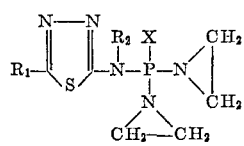

wherein $R_1$ is a member of the group consisting of hydrogen, lower alkyl and halogen, $R_2$ is a member of the group consisting of hydrogen, lower alkyl and phenyl and X is a member of the group consisting of oxygen and sulfur.

2. N,N'-diethylene - N'' - ethyl-N''-(1,3,4-thiadiazol-2-yl)phosphoramide.

3. N,N'-diethylene - N'' - butyl-N''-(1,3,4-thiadiazol-2-yl)phosphoramide.

4. N,N'-diethylene - N" - methyl-N"-(1,3,4-thiadiazol-2-yl)phosphoramide.

5. N,N'-diethylene - N" - phenyl-N"-(1,3,4-thiadiazol-2-yl)phosphoramide.

6. N,N'- diethylene - N" - ethyl - N" - (5-methyl-1,3,4-thiadiazol-2-yl)phosphoramide.

7. N,N' - diethylene - N" - ethyl - N"-(5-bromo-1,3,4-thiadiazol-2-yl)phosphoramide.

8. N,N'-diethylene - N" - ethyl - N"-(5-chloro-1,3,4-thiadiazol-2-yl)phosphoramide.

9. N,N'-diethylene - N" - ethyl-N"-(1,3,4-thiadiazol-2-yl)thiophosphoramide.

References Cited in the file of this patent

UNITED STATES PATENTS

| | | |
|---|---|---|
| 2,966,495 | Song et al. | Dec. 27, 1960 |
| 3,025,303 | Ifversen et al. | Mar. 13, 1962 |
| 3,041,241 | Timmis et al. | June 26, 1962 |
| 3,051,625 | Rao | Aug. 28, 1962 |